United States Patent
Krogager et al.

(10) Patent No.: US 8,871,126 B2
(45) Date of Patent: Oct. 28, 2014

(54) MANUFACTURING METHOD FOR TRUMPET SPAR AND OTHER CURVED OBJECTS

(75) Inventors: Max Krogager, Linköping (SE); Mikael Petersson, Linköping (SE); Björn Weidmann, Borensberg (SE); Ingemar Turesson, Linköping (SE); Anders Westerdahl, Linköping (SE); Jan Vaara, Linköping (SE)

(73) Assignee: Saab AB, Linköping (SE)

( * ) Notice: Subject to any disclaimer, the term of this patent is extended or adjusted under 35 U.S.C. 154(b) by 1783 days.

(21) Appl. No.: 11/538,442

(22) Filed: Oct. 4, 2006

(65) Prior Publication Data
US 2008/0048359 A1 Feb. 28, 2008

(30) Foreign Application Priority Data
Oct. 17, 2005 (EP) .................................... 05109658

(51) Int. Cl.
| | | |
|---|---|---|
| B29C 70/34 | (2006.01) | |
| B32B 27/04 | (2006.01) | |
| B32B 37/00 | (2006.01) | |
| B29C 70/30 | (2006.01) | |
| B29C 70/54 | (2006.01) | |
| B29L 31/30 | (2006.01) | |
| B32B 38/18 | (2006.01) | |

(52) U.S. Cl.
CPC ........... *B29C 70/342* (2013.01); *B32B 38/1841* (2013.01); *B32B 38/1808* (2013.01); *B29L 2031/3085* (2013.01); *B29C 70/34* (2013.01); *B32B 38/1866* (2013.01); *B32B 37/0015* (2013.01); *B32B 27/04* (2013.01); *B29C 70/30* (2013.01); *B29C 70/543* (2013.01)

USPC ........... 264/258; 264/101; 264/339; 156/227; 156/299; 156/307.1

(58) Field of Classification Search
CPC B29C 70/34; B32B 38/1808; B32B 38/1833; B32B 38/1841; B32B 38/1858; B32B 38/1866; B29D 99/0003; B29L 2031/003; B29L 2031/3085
USPC ......... 264/258, 553, 136, 137, 257, 237, 322, 264/101, 102, 339; 156/196, 227, 285, 286, 156/299, 307.1
See application file for complete search history.

(56) References Cited

U.S. PATENT DOCUMENTS 4,475,976 A * 10/1984 Mittelstadt et al. ............ 156/286
5,641,366 A * 6/1997 Hohman ....................... 156/62.8
(Continued)

FOREIGN PATENT DOCUMENTS

| EP | 0 431 916 | 6/1991 |
|---|---|---|
| EP | 0431916 | 6/1991 |

(Continued)

*Primary Examiner* — Atul P. Khare
(74) *Attorney, Agent, or Firm* — Venable LLP; Eric J. Franklin

(57) ABSTRACT

A method for producing an object of composite material comprising the steps of:
    placing one or several prepregs on a plane surface, forming a fiber stack;
    lifting over the fiber stack to a molding tool;
    downforming the fiber stack;
    curing the downformed fiber stack;
where the method also comprises the step of:
    orienting the fiber directions so that all fibers, when the fiber stack is lifted over to the molding tool, will cross an edge of the molding tool only once.

13 Claims, 1 Drawing Sheet

(56) References Cited

U.S. PATENT DOCUMENTS

| | | | |
|---|---|---|---|
| 5,648,109 A * | 7/1997 | Gutowski et al. | 425/504 |
| 6,586,110 B1 * | 7/2003 | Obeshaw | 428/593 |
| 7,469,735 B2 * | 12/2008 | Brown et al. | 156/392 |
| 7,670,525 B2 * | 3/2010 | Weidmann et al. | 264/255 |
| 7,943,076 B1 * | 5/2011 | Hawkins et al. | 264/258 |
| 8,151,529 B2 * | 4/2012 | Weidmann et al. | 52/309.13 |
| 8,632,653 B2 * | 1/2014 | Brown et al. | 156/304.1 |
| 2003/0175520 A1 * | 9/2003 | Grutta et al. | 428/411.1 |
| 2005/0089707 A1 * | 4/2005 | Obeshaw | 428/593 |

FOREIGN PATENT DOCUMENTS

| | | |
|---|---|---|
| EP | 1 145 828 | 10/2001 |
| EP | 1145828 | 10/2001 |

* cited by examiner

MANUFACTURING METHOD FOR TRUMPET SPAR AND OTHER CURVED OBJECTS

TECHNICAL FIELD

The present invention relates to methods and means for producing parts of composite material. More specifically, it relates to such objects being made of fibre laminate and a matrix, e.g. plastic, and more specifically to spars produced in this way.

BACKGROUND

Aircraft manufacturers are under an increasing pressure to produce lightweight, strong and resistant aircraft which also has the lowest productions costs and also low costs for maintenance during the entire lifetime of the aircraft. An aircraft must be strong enough to cope with stresses during take-off, high altitude cruising and landing, and at the same time it must be as easy as possible to maximise the performance of the aircraft. Partly because of this, aircraft manufacturers have started to use fibre reinforced resin matrix composites.

Such fibre reinforced resin matrix composites provide improved strength, wear resistance, rigidity and strength-weight relationship by comprising strong, rigid carbon fibres in a softer, more tensile resin matrix. The resin matrix material transmits forces to the fibres and provides stretching and toughness characteristics, since the fibres bear a major part of the applied forces.

Known methods for producing fibre reinforced resin matrix composites for an aircraft comprise that a number of so called prepreg sheets, or simply abbreviated as "prepregs" are put on top of each other in contact with a moulding tool. The prepreg consists of unidirectional fibres or multi-directional fibres in an uncured resin. A vacuum bag is placed over and is sealed towards the moulding tool so that the entire component is completely enclosed. Vacuum is then applied to the enclosed component so that the prepregs are becoming compacted towards the surface of the moulding tool.

When producing composite spars, it is cost efficient to arrange the majority of, or all of, the prepreg sheets (e.g. [0/90/±45]) of a composite laminate plane, and thereafter form down the flanges. This is relatively simple as long as the forming takes place along a straight line. Problem arises when the surface to be shaped is not straight—e.g. when bending alongside a curved line or trumpet form, for instance when producing wing spars for some airplanes, so called trumpet spars.

Thus, there is a need to provide a method to in a simple manner produce composite components with one or more curved surfaces.

SUMMARY OF THE INVENTION

The present invention relates to a method for producing an object of composite material comprising the steps of:
  providing a moulding tool;
  placing one or more prepregs on the moulding tool, thus forming a fibre stack wherein the fibre directions of the prepregs are oriented in such a way that none of the fibre directions of said prepregs occur parallel with a curve of said moulding tool;
  downforming the fibre stack;
  curing the downformed fibre stack.
Furthermore, the method may comprise the step of orienting the fibre directions of the prepregs such that the difference between a critical fibre direction, i.e. the fibre direction which is most parallel with the curve, and the curve is such that a downforming being carried out thereafter may be carried out in a simple manner by means of conventional downforming methods. The fibre directions of the prepregs are oriented so that the difference between any fibre direction in the stack and a curve of said tool is between zero and 90 degrees, between 5 and 85 degrees, between zero and 45 degrees, between 5 and 40 degrees, or between 10 and 35 degrees. Depending on the fibre directions of the fibre stack also different fibre directions of the prepregs may be oriented so that the difference between the fibre direction of a stack and a curve of said tool is between zero and 22.5 degrees, or between 5 and 17.5 degrees or between 10 and 12.5 degrees.

The present invention further relates to a method for producing an object of composite material comprising the steps of:
  providing a moulding tool;
  placing one or several prepregs on the moulding tool, forming a fibre stack, wherein prepreg fibre directions are selected which deviate from each direction which may be formed by connecting two points on the edge 106, lacking moulding tool in between;
  downforming the fibre stack;
  curing the downformed fibre stack.
Furthermore there is provided a similar method for producing an object of composite material comprising the steps of:
  placing one or several prepregs on a plane surface, thereby forming a fibre stack where the directions of the fibres are oriented such that all fibres, when the fibre stack is being lifted over to the moulding tool, will cross an edge of the moulding tool only once;
  downforming the fibre stack;
  curing the downformed fibre stack.
The invention also relates to an object produced by means of the method described above.

BRIEF DESCRIPTION OF THE DRAWINGS

The above aspects and further advantages of the present invention will become more apparent when the following detailed description is read together with the accompanying drawings wherein.

DETAILED DESCRIPTION OF PREFERRED EMBODIMENTS

Figure 1A:
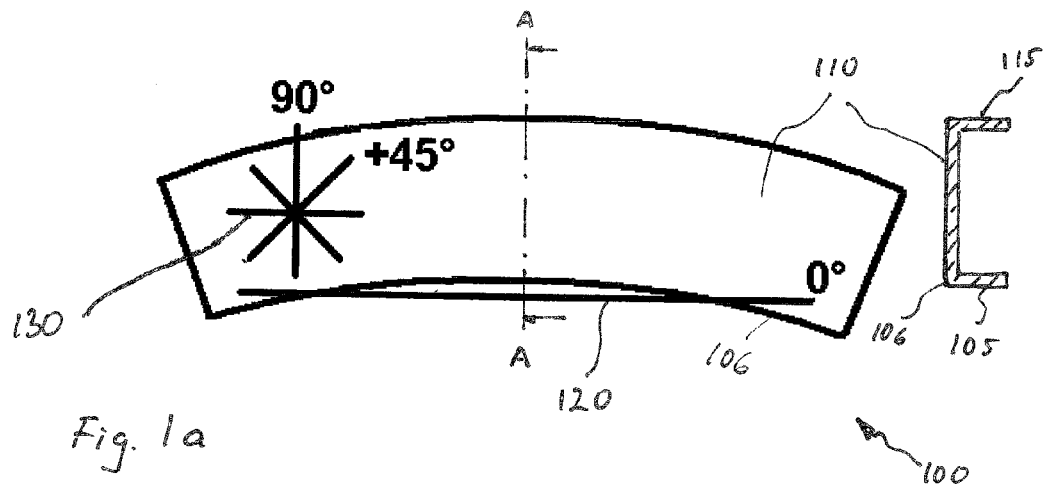
FIG. 1a is a schematic top view of a moulding tool for a spar with a rib and two curved flanges and a fibre star indicating the fibre directions for prepregs of uni-directional fibres (fibre tape) in the way they would be arranged if one should try to produce the spar in a conventional manner.

In the present specification, the following terms shall be interpreted as follows:

Prepreg—"Prepreg" shall here be interpreted as being a fibre tape or a fibre fabric or a non-woven fibre cloth or any other type of fibre layer, which has been impregnated with a matrix.

Matrix—"Matrix" shall here be interpreted to be a material which, as is well known in this technical field, binds together the fibres in a composite material, or a material which is used in order to bind together the fibres in a composite material.

Fibre tape—"Fibre tape" shall here be interpreted as being a fibre layer in which the fibres are oriented substantially in one single direction, so called unidirectional fibres, and thus contains solely or mainly only parallel fibres.

Fibre fabric—"Fibre fabric" shall here be interpreted to be a fibre layer in which the fibres are oriented in two or more directions, and in which the fibres in the different directions are woven or twisted together in some way.

Stack—"Stack" or "fibre stack" shall here be interpreted to be a number of prepregs put on top of each other.

Downforming—"Downforming" shall here be interpreted to be the process of applying a pressure on a prepreg being placed on a moulding tool, said pressure being applied in a specific direction in order to make the prepreg to better follow the moulding tool.

Critical fibre direction—"Critical fibre direction" shall here be interpreted to be the fibre direction of some of the prepregs which is most parallel with a curve of the moulding tool.

The inventors have identified difficulties associated with the production of curved parts made of composite material. Different explanation models have been proposed and different ways of solving the problems have been tested. The inventors have realised that the main problem is that fibres intended to follow a concave surface tend to take the shortest trip way and want to hang stretched in the air, confer with a string of a bow, roughly speaking. When such a stretched fibre is to be formed down and pressed close towards a moulding tool it is stretched and offers resistance, and forming of e.g. a flange becomes impossible. One way of solving the problem is to cut up the fibres, but this is expensive, time consuming and decreases the strength. A purpose of the present invention is to provide a cost effective, fast and simple method which also preserves or improves the strength.

A technical solution for the forming along a curved line is to avoid fibres which get hung up. This can be achieve by carefully choosing the fibre directions beforehand so that there will be no fibres contacting two points of the moulding tool where there is a line passing in the free air between said points and outside said moulding tool. It is often necessary, due to requirements regarding strength, that the composite laminate comprises many fibre directions—e.g. [0/90/45]. So a technical solution of the problem is to simply turn the entire "fibre stack" (i.e. all fibre directions). Turning the entire [0/90/±45]—"stack" by 10 degrees gives the result [10/100/55/-35]. In this way the original stack is being kept at the same time as hanging fibres are avoided. In practice, it is of course not a prepared ready to use fibre stack that is turned, but instead already when punching the prepregs, fibre directions are chosen so that when said prepregs are put on the moulding tool their three-dimensional orientation will be such that a line of sight between two points on said moulding tool does not correspond with any fibre.

In conventional methods, the fibre stack [0/90+45/−45]s8 is the most common but also [+30/−30/90]s6 and [0/22.5/45/67.5/90]s12 has given good results when tested. The term "s" in "s8", "s12" etc means symmetrical, i.e. the stack is mirrored in the middle and becomes symmetrical, i.e. the layers are oriented in a sequential order so that the same fibre direction is obtained on the outer layers, the same fibre direction on the second next outer layers and so on. For instance the fibre stack [0/90+45/−45]s8 is built up of the layers having the fibre directions 0, 90, +45, −45, −45, +45, 90, 0. The number after "s" indicates the number of layers (8 in the example).

Practical forming attempts have shown that the method to choose displaced fibre directions works well and that the fibres do not make resistance at downforming.

Example 1

Producing Wing Spar With Curved Flange

Figure 1B:
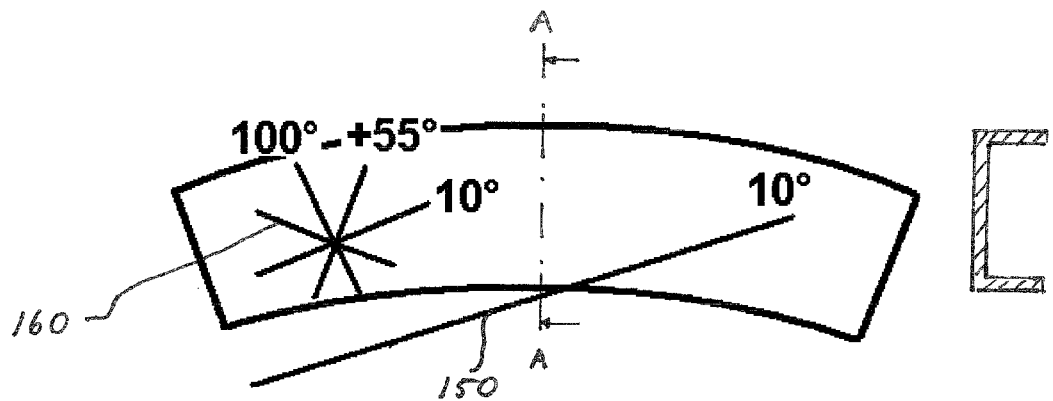
FIG. 1b schematically shows the moulding tool for the spar in FIG. 1a and a fibre star indicating the fibre directions according to a preferred embodiment of the present invention.

FIGS. 1a and 1b show part of a moulding tool for a wing spar with a curved flange. The moulding tool 100 is provided with a spar rib surface 110 for the becoming spar rib, a concave flange surface 105 for the becoming concave flange, and a convex flange surface 115 for the becoming concave flange. Furthermore, there is outlined in FIG. 1a a fibre 120 with a fibre direction of zero (0) degrees relatively a reference direction extending parallel with the longitudinal direction of the spar, for illustrating a critical fibre direction, which probable would arise if the spar would be produced in a conventional manner. Furthermore, there is outlined a fibre star 130 illustrating the other fibre directions in a reasonably chosen stack for producing a spar.

In FIG. 1b there is further outlined a fibre 150 illustrating a choice of fibre direction according to one embodiment of the invention. The fibre 150 has been given the direction 10 degrees relative to the reference above. Tests have shown that a stack comprising a prepreg with such a fibre direction allows itself to be downformed in a simple manner. Furthermore, there is in FIG. 1b outlined a fibre star 160 illustrating the other fibre directions for the fibres in prepregs in prepreg stacks according to this embodiment.

In another preferred embodiment, the prepreg is first put on a plane surface. The fibre directions are then oriented so that all fibres, when the fibre stack is being lifted to the moulding tool, will cross one and the same edge of the moulding tool only once. The inventors have realised that if a fibre 120, as expressed in FIG. 1a, in the plane, passes over the edge 106 twice before the prepreg is folded down towards a flange surface 105 of the moulding tool, problems of hanging fibres will arise and the fibres will not follow the moulding tool. The solution is thus to make sure that no fibres cross the edge 106 of the moulding tool twice, by choosing fibre directions which deviate from each direction which possibly may be formed by connecting two points on the edge 106, which points lack moulding tool in between.

The advantage of the method described above, comprises that composite objects having a complicated geometry, e.g. certain wing spars for airplanes, may be produced in a very cost efficient way by: exploiting an automatic taping machine, a so called ATL-machine; to put the entire stack on a plane surface in one single working moment; and to form the entire fibre stack in one single working moment.

The invention claimed is:

1. A method for producing an object of composite material, the method comprising:
   providing a curved molding tool having a curved spar rib surface forming corners at opposite sides thereof with a concave flange surface and a convex flange surface, each corner having a curvature matching that of the spar rib surface, and the concave and convex flange surfaces each having a curvature matching that of its respective corner with the spar rib surface;
   forming a fiber stack of a plurality of fiber prepregs over the spar rib surface so that the fiber stack folds over each of said corners, wherein no fiber directions of the fiber stack are parallel with curvature of the molding tool, and wherein all fibers of the fiber stack cross each of said corners only once;
   downforming the fiber stack by activation of a vacuum bag applying pressure causing the fiber stack to conform to the molding tool; and
   curing the downformed fiber stack.

2. The method according to claim 1, wherein fiber directions of the prepregs are oriented so that a difference between a critical prepreg fiber direction and said curvature of the molding tool permits downforming in a simple manner, the critical prepreg fiber direction being a fiber direction which is most parallel with said curvature of the molding tool.

3. The method according to claim 1, wherein a difference between any stack fiber direction and said curvature of the molding tool is between 0 and 90 degrees.

4. The method according to claim 1, wherein a difference between any stack fiber direction and said curvature of the molding tool is between 5 and 85 degrees.

5. The method according to claim 1, wherein a difference between any stack fiber direction and said curvature of the molding tool is between 0 and 45 degrees.

6. The method according to claim 1, wherein a difference between any stack fiber direction and said curvature of the molding tool is between 5 and 40 degrees.

7. The method according to claim 1, wherein a difference between any stack fiber direction and said curvature of the molding tool is between 10 and 35 degrees.

8. The method according to claim 1, wherein a difference between stack fiber direction and said curvature of the molding tool is between 0 and 22.5 degrees.

9. The method according to claim 1, wherein a difference between stack fiber direction and said curvature of the molding tool is between 5 and 17.5 degrees.

10. The method according to claim 1, wherein a difference between stack fiber direction and said curvature of the molding tool is between 10 and 12.5 degrees.

11. The method according to claim 1, wherein the concave and convex flange surfaces comprise curved planes, and wherein the spar rib surface comprises a plane having curved edges forming said corners at intersections with the concave and convex flange surfaces.

12. The method according to claim 1, wherein each fiber prepreg comprises one of a fiber tape, a fiber fabric, and a non-woven fiber cloth.

13. The method according to claim 1, wherein each fiber prepreg is a fiber tape of unidirectional fibers impregnated with a matrix material.

\* \* \* \* \*